(12) United States Patent
Maeda et al.

(10) Patent No.: US 7,394,737 B2
(45) Date of Patent: Jul. 1, 2008

(54) SKEW CONTROL METHOD AND SKEW CONTROL UNIT

(75) Inventors: Yasuaki Maeda, Kanagawa (JP); Masahiro Shigenobu, Kanagawa (JP)

(73) Assignee: Sony Corporation, Tokyo (JP)

( * ) Notice: Subject to any disclaimer, the term of this patent is extended or adjusted under 35 U.S.C. 154(b) by 408 days.

(21) Appl. No.: 10/936,746

(22) Filed: Sep. 9, 2004

(65) Prior Publication Data
US 2005/0063262 A1   Mar. 24, 2005

(30) Foreign Application Priority Data
Sep. 22, 2003   (JP) ............................. 2003-330248

(51) Int. Cl.
*G11B 20/18* (2006.01)
(52) U.S. Cl. .................................. 369/53.19
(58) Field of Classification Search .............. 369/53.19
See application file for complete search history.

(56) References Cited

U.S. PATENT DOCUMENTS

| 6,842,414 | B1 * | 1/2005 | Park ........................ 369/53.19 |
| 6,876,614 | B2 * | 4/2005 | Raaymakers ............ 369/53.19 |
| 7,164,639 | B2 * | 1/2007 | Yamamoto et al. ....... 369/53.19 |

FOREIGN PATENT DOCUMENTS

| EP | 1 098 323 A2 | 5/2001 |
| EP | 1 587 079 A1 | 10/2005 |
| GB | 2 159 292 A | 11/1985 |
| JP | 60-66341 | 4/1985 |
| JP | 61-196434 | 8/1986 |
| JP | 10-83549 | 3/1998 |
| JP | 11-283264 | 10/1999 |
| JP | 2000-242932 | 9/2000 |
| JP | 2000-348362 | 12/2000 |
| JP | 2001-23213 | 1/2001 |
| JP | 2004-095044 | 3/2004 |
| JP | 2004-095129 | 3/2004 |
| JP | 2004-519806 | 7/2004 |
| WO | WO 02/073609 A1 | 9/2002 |

* cited by examiner

*Primary Examiner*—Tan Dinh
*Assistant Examiner*—Parul Gupta
(74) *Attorney, Agent, or Firm*—Oblon, Spivak, McClelland, Maier & Neustadt, P.C.

(57) ABSTRACT

The present invention relates to a skew control method and a skew control unit by which stable skew control can be performed with a simple configuration without the need for a dedicated skew sensor.

Focus drive voltages V1 and V2 are measured at a plurality of points P1 and P2 set by moving an optical pick-up 31 in the radial direction of an optical disc 2 in a state where a focus servo of the optical pick-up 31 is ON, and skew angle control is performed so that V1 and V2 are equal to each other.

13 Claims, 9 Drawing Sheets

SKEW CONTROL METHOD AND SKEW CONTROL UNIT

BACKGROUND OF THE INVENTION

1. Field of the Invention

The present invention relates to a skew control method and a skew control unit which are suitably applied to a recording apparatus or playback apparatus for a disc, such as an optical disc, magnetic optical disc, or phase change disc on/from which data is optically recorded or reproduced (hereinafter, these discs are referred to as merely "optical disc").

This application claims priority of Japanese Patent Application No. 2003-330248, filed on Sep. 22, 2003, the entirety of which is incorporated by reference herein.

2. Description of the Related Art

An optical disc apparatus for recording and reproducing data on/from an optical disc is configured to perform a tracking servo control which allows a laser beam radiated from an optical pick-up to follow a track formed on a surface of the disc to record data on the track, or reproduce the recorded data from the track.

An optical disc like a CD (Compact Disc) has a large capacity and allows random access. Further, since optical reading is performed in a noncontact manner, the optical disc is in less danger of a head crash or wear and damage through reading operations than a contact-type recording medium like a magnetic tape. Moreover, a solid disc surface of the optical disc reduces the possibility of accidental data loss. Such an optical disc, which has many advantages as described above, is a recording medium that serves excellently as a memory used in the peripheral of a personal computer, and is superior in data creation or data save.

In recent years, a recording/playback apparatus using a recordable optical disc called CD-R (Compact Disc-Recordable) has been developed.

Some CD-Rs can easily record data in all standard formats for use in compact discs such as a CD-ROM, a CD-ROM/XA, a CD-I, and a CD-DA. Today, the CD-R has replaced conventional magnetic tape, magnetic disc or the like as a recording/playback apparatus for use in an electronic apparatus for recording or reproducing data, which has increasingly come to be used.

Further, for a DVD, which is an optical disc that handles large capacity data such as video data, a DVD-R (DVD-Recordable) which is of write once type, and a DVD-RW (DVD-Rewritable) and a DVD-RAM (DVD-Random Access Memory) which are rewritable, are available as a recordable optical disc.

With an optical disc, data is read out with a converged light beam focused on a disc surface in general. If the central axis (optical axis) of the converged light beam is not perpendicular to a signal recording surface of the disc, a coma aberration is generated on a focal point surface to degrade characteristics (Modulation Transfer Function etc.) of the read out signal, with the result that data cannot be read out correctly. A DVD or DVD-R has a higher recording density than a CD, and accordingly an NA (Numerical Aperture) of an objective lens is generally increased, so that the coma aberration is increased compared to the tilt between the disc surface and the central axis. That is, when a laser beam is radiated to the track formed on the optical disc, the signal recording surface on which the track is formed must be perpendicular to the radiated laser beam. However, since the optical disc is made of a resin material and the like, there are many cases where a warpage of the disc occurs due to variations in products or moisture absorption, or depending on the state of preservation. Accordingly, when the laser beam scans the track positioned in the portion that the warpage has occurred, the laser beam and the signal recording surface are not perpendicular to each other, with the result that recorded data cannot be read out correctly.

For this reason, skew control has been performed, in which a skew sensor which detects the distance or tilt between a disc surface (or signal recording surface) and an optical pick-up is used to correct a relative tilt between the disc and optical pick-up based on a detection signal of the skew sensor so that a laser beam always strikes the signal recording surface at right angles (refer to, for example, Jpn. Pat. Appln. Laid-Open Publication No. 11-86310).

However, when a dedicated sensor is provided for this skew control, a configuration of the optical pick-up grows correspondingly complex, leading to an increase in production cost and size of the optical pick-up.

Further, when the skew sensor is used for skew control, skew values to be detected change in each case due to aging characteristics or thermal behavior of the sensor, with the result that stable skew control cannot be achieved.

SUMMARY OF THE INVENTION

In view of the above problems in the conventional skew control, an object of the present invention is to provide a skew control method and a skew control unit enabling a stable skew control to be performed with a simple structure without the need for a dedicated skew sensor. Another object of the present invention is to provide a means and method enabling skew control to be satisfactorily performed also in an apparatus used outdoor.

According to one aspect of the present invention, there is provided a skew control method for an optical disc drive apparatus having a radial skew control mechanism, comprising the steps of: measuring a focus drive signal amplitude at a plurality of points set by moving an optical pick-up in the radial direction of an optical disc in a state where a focus servo of the optical pick-up is ON; and controlling skew angle so that voltage values at the points are equal among them.

According to another aspect of the present invention, there is provided a skew control unit included in an optical disc drive apparatus having a radial skew control mechanism, comprising a skew control means for measuring a focus drive signal amplitude at a plurality of points set by moving an optical pick-up in the radial direction of an optical disc in a state where a focus servo of the optical pick-up is ON and controlling skew angle so that voltage values at the points are equal among them.

In the present invention, in an optical disc drive having a radial skew control mechanism, a focus drive signal amplitude is measured at a plurality of points set by moving an optical pick-up in the radial direction of an optical disc in a state where a focus servo of the optical pick-up is ON and skew angle is controlled so that voltage values at the points are equal among them. As a result, without the need for a dedicated skew sensor and without being influenced by the reflectance of a disc or recording state, it is possible to perform stable skew control with a simple configuration.

In the present invention, a point at which the focus drive signal amplitude does not change even when skew angle is changed is selected as one measurement point of the focus drive signal amplitude. This leads to a reduction in the number of measuring points and realizes skew control with, for example, only one measurement point. As a result, simplified, high-speed and stable control can be realized.

In the present invention, after each completion of skew controls, whether a focus drive signal amplitude at each measurement point is a value that falls in a predetermined expected range (e.g., a value obtained at first measurement) is confirmed. When the focus drive signal amplitude at each measurement point is out of the predetermined range, it is determined that correct skew control has not been achieved due to influence of disturbance or posture difference and skew control is again performed from the top. Therefore, skew control can be performed without fail even with posture difference or disturbance.

In the present invention, a skew existing in the optical pick-up by nature can be corrected by adding the focus drive signal amplitude corresponding to a skew existing in the optical pick-up to the measured focus drive signal amplitude. That is, it is possible to perform skew control so that an optical axis of the optical pick-up and a disc are perpendicular to each other even when the optical axis is not perpendicular to the optical pick-up.

In the present invention, a focus drive signal amplitude is measured more than once, and it is confirmed whether a variation in the measured voltage values falls in a predetermined range. If the variation in the measured voltage values is out of the predetermined range, it is determined that disturbance or posture difference has occurred, and the skew control operation is not performed until influence of disturbance or posture difference disappears and measurement values fall in the predetermined range. As a result, skew control can be performed without fail even with posture difference or disturbance.

In the present invention, a focus drive signal amplitude is measured at a plurality of points set in correspondence with disc rotation. The measurement points are disposed at regular intervals, and start to end of the measurement points is an integral multiple of a disc rotation circle. As a result, it is possible to correctly measure an average focus drive signal amplitude even for a disc with surface runout, that is, positions of the disc and objective lens are accurately obtained.

Therefore, according to the present invention, it is possible to perform skew control based on a focus drive signal amplitude, without being influenced by a change in posture difference or disturbance during execution of skew control.

DESCRIPTION OF THE PREFERRED EMBODIMENTS

An embodiment of the present invention will be described below in detail with reference to the accompanying drawings.

Figure 1:
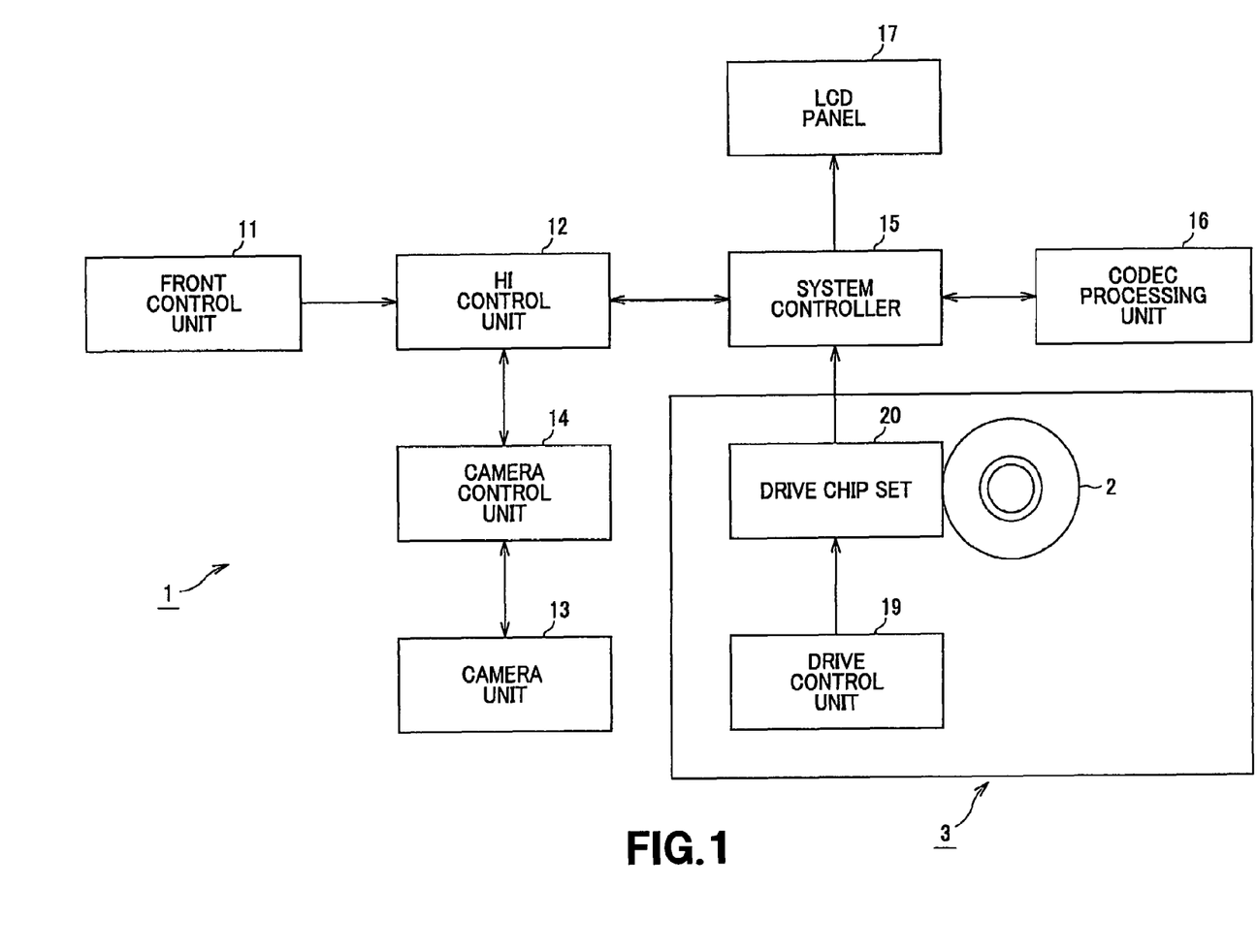
FIG. 1 is a block diagram showing a configuration of a disc camcorder to which the present invention is applied.

The present invention is applied to, for example, a disc camcorder 1 having a configuration as shown in the block diagram of FIG. 1.

The disc camcorder 1 is configured to record results of imaging operation on an optical disc 2 such as a DVD-R (DVD-Recordable) or a DVD-RW (DVD-Rewritable), and comprises: a disc drive 3 into which the optical disc 2 is inserted; a front control unit 11 for generating an operation control signal in response to a user's input operation; an HI control unit 12 for exchanging various pieces of information with other components of the disc camcorder 1 in response to at least the operation control signal output from the front control unit 11; a camera unit 13 for imaging a subject to generate an image signal; a camera control unit 14 for controlling the camera unit 13; a system controller 15 for controlling each component of the disc camcorder 1; a codec processing unit 16 for compressing/expanding the image signal; and an LCD panel 17 connected to the system controller 15, for displaying information to a user.

The disc drive 3 includes a drive control unit 19, and a drive chip set 20 disposed between the system controller 15 and drive control unit 19.

The front control unit 11 is configured to: generate an EJECT signal in response to an input that is caused by a depression of an eject switch attached to an outer surface of a casing of the disc camcorder 1 so as to transmit the EJECT signal to the HI control unit 12; generate a PW signal in response to the input that is caused by a depression of a power switch attached to the outer surface so as to transmit the PW signal to the HI control unit 12; perform clock control operation in the disc camcorder 1; and generate a predetermined operation control signal depending on the type of the key that has been depressed so as to transmit it to the HI control unit 12. Incidentally, the input that is caused by the depression of the key is often replaced by a reception of a radio signal transmitted from a remote controller (not shown).

The HI control unit 12 is configured to: generate an EJ control signal based on the EJECT signal received from the front control unit 11 so as to transmit the generated EJ control signal to the drive control unit 19 of the disc drive 3; perform ON/OFF control of a power supply of the disc camcorder 1 based on the PW signal received from the front control unit 11; exchange, via e.g., an I/O sync bus, various pieces of information with the camera control unit 14, or with the system controller 15; generate commands based on the various operation control signals received from the front control unit 11 so as to transmit the generated commands to the each component or to perform a predetermined operation. For example, when a recording mode or a playback mode is specified by a user through the front control unit 11, a corresponding operation control signal is transmitted to the HI control unit 12. Based on the operation control signal, the HI control unit 12 identifies the specified mode in detail and then transmits a predetermined control signal to the drive control unit 19 of the disc drive 3.

In addition, the HI control unit 12 controls DVD playback navigation, exchanges data with another electronic device via a USB (Universal Serial Bus) interface or the like.

The camera unit 13 generates an image signal through photoelectric conversion using, for example, a CCD image sensor based on the imaged subject. This camera unit 13 applies, for example, correlation double sampling to the generated image signal to remove noise components, and performs signal processing such as shading correction, masking correction, knee correction, gamma correction, outline compensation, or the like, followed by amplifying the resultant signal so as to transmit the amplified signal to the HI control unit 12 via the camera control unit 14.

The camera control unit 14 performs control of video signal processing in the camera unit 13, zoom adjustment, pan/tilt adjustment, focus adjustment as well as mechanical shutter control, strobo control, camera shake correction and the like.

The codec processing unit 16 converts the image signal obtained by the camera unit 13 to a digital signal to generate video data. Based on the control exercised by the system controller 15, this codec processing unit 16 performs data compression according to an MPEG (Moving Picture Experts Group) 2 scheme when the generated video data is a moving picture, or performs data compression according to a JPEG (Joint Photographic Coding Experts Group) scheme when the generated data is a still image. The compressed video data is transmitted to the drive control unit 19 of the disc drive 3, followed by being transmitted to another electronic device via a USB cable connected to the HI control unit 12. Thus, it is possible for a user to monitor imaging results and playback results of the disc camcorder 1 on an external device. Incidentally, the codec processing unit 16 may generate thumbnail images of the compressed video data.

At playback time, the codec processing unit 16 expands the video data obtained based on a playback RF signal read out from the optical disc 2 in a manner corresponding to each of the aforementioned schemes.

The system controller 15 is configured to: time division multiplex the video data output from the codec processing unit 16 at recording time so as to add header information unique to a DVD, header information of an extension file, or the like to the time division multiplexed video data; generate UDF data, VMG data, VTSI data or the like so as to output the data to the drive control unit 19 of the disc drive 3. Further, the system controller 15 uses a RAM (not shown) to generate an error-correction code and add it to the video data at recording time. At this moment, the system controller 15 may apply scrambling, or 8/16-nodulation to the video data.

The system controller 15 performs graphic processing in the LCD panel 17, and controls brightness of a backlight or the like disposed on the back surface of the LCD panel 17.

The LCD panel 17, which is made of a large number of liquid crystal display elements and the like, serves as an electronic viewfinder configured to display information to a user. This LCD panel 17 displays a predetermined message under the control of the system controller 15.

The drive control unit 19 of the disc drive 3 controls recoding/readout of video data on/from the optical disc 2, as well as spindle drive of the optical disc 2, and focus drive, tracking drive, sled drive of the optical pick-up. Further, the drive control unit 19 controls an eject mechanism for the user to eject the optical disc 2 inserted into the disc drive 3 based on the EJ control signal transmitted from the HI control unit 12.

A configuration of the disc drive 3 will be described in detail later.

With the disc camcorder 1 having the above configuration, it is possible to compress an image signal obtained based on an imaged subject to generate video data and record the video data on the optical disc 2. Further, at playback time, it is possible to expand the video data read out from the optical disc 2, and display the expanded video data through the LCD panel 17, or transmit the expanded video data to another electronic device to monitor the data.

Next, details of the disc drive 3 will be described hereinafter with reference to a block diagram of FIG. 2.

Figure 2:
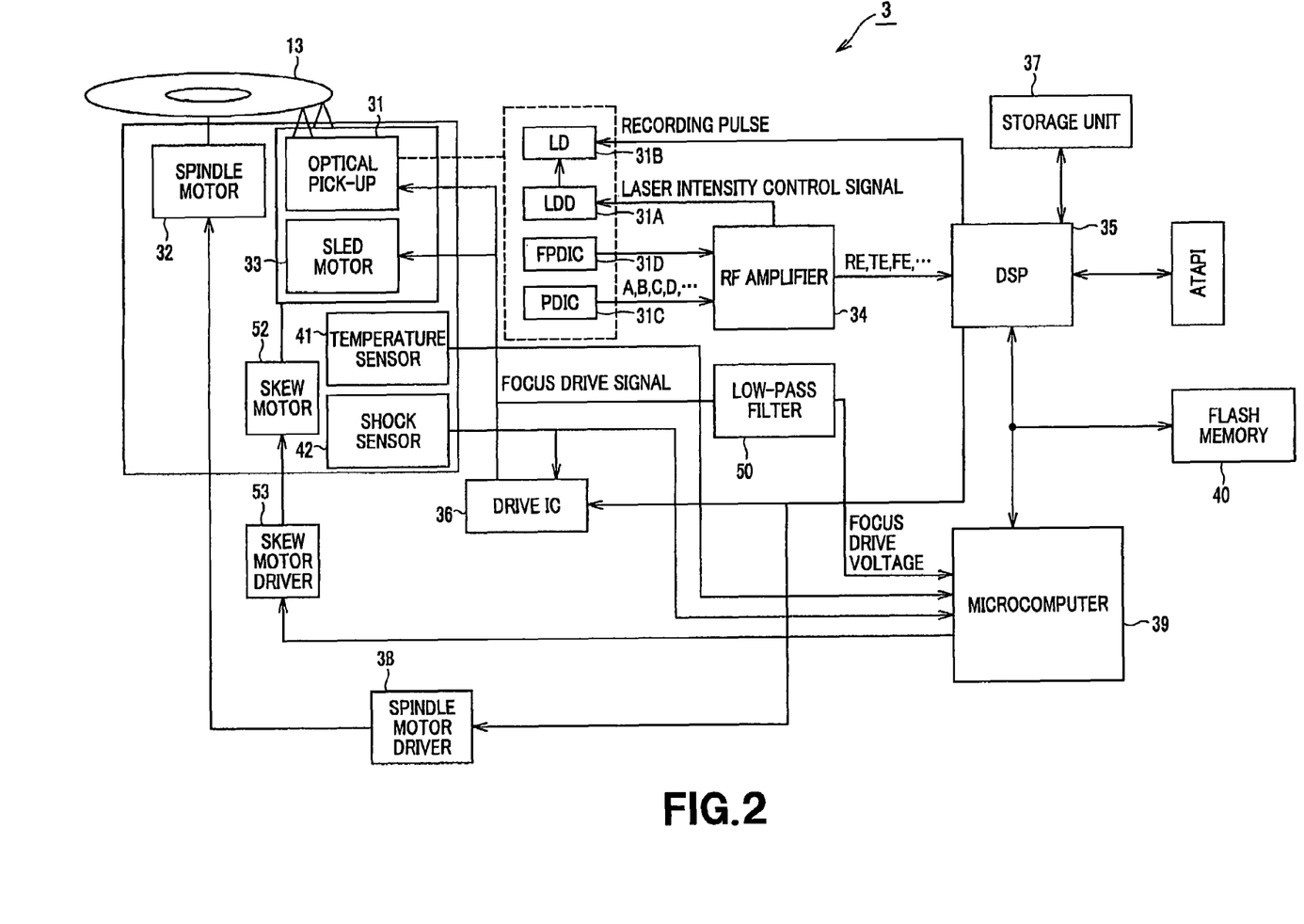
FIG. 2 is a block diagram showing a configuration of a disc drive included in the disc camcorder.

As shown in FIG. 2, the disc drive 3 comprises: an optical pick-up 31 for recording video data on the inserted optical disc 2 or detecting the video data recorded on the optical disc 2; a spindle motor 32 for rotating the optical disc 2; a sled motor 33 for moving the optical pick-up 31 in the radial direction of the optical disc 2; an RF amplifier 34 connected to the optical pick-up 31; a DSP (Digital Signal Processor) 35 for transmitting a signal from the RF amplifier 34 to a storage unit 37 and generating various servo drive signals; a drive IC 36 for controlling the sled motor 33 and a biaxial coil (not shown) in the optical pick-up 31 based on the servo drive signal from the DSP 35 connected thereto; a spindle motor driver 38 for controlling the spindle motor 32 based on the servo drive signal from the DSP 35 connected thereto; a skew motor 52 for changing tilt of the optical pick-up 31 relative to the optical disc 2; a skew motor driver 53 for driving the skew motor 52 based on a skew control signal; a microcomputer 39 for controlling each of the above components; a flash memory 40 for storing a program executed for the DSP 35 and microcomputer 39; and a temperature sensor 41 for detecting temperature in the disc drive 3 and a shock sensor 42 for detecting shock and the like, each of which being connected to the microcomputer 39.

The optical pick-up 31 is configured to: emit a laser beam from a laser diode (LD) 31B incorporated therein, which is driven by a laser diode driver (LDD) 31A, and focus the laser beam on an information recording surface of the optical disc 2 by means of an objective lens; guide a returned laser beam from the optical disc 2 to photodetection elements or a photodetector IC (PDIC) 31C for detecting a signal and a focus photodetector IC (FPDIC) 31D for detecting a focus signal by means of the objective lens and output the light received by the photo-detection elements to the RF amplifier 34; and use a biaxial coil (not shown) to move the objective lens of the optical pick-up 31 in the optical axis direction and in the direction perpendicular to the optical axis direction based on a focus drive signal and a tracking start signal supplied from the drive IC 36.

Attached integrally to the spindle motor 32 is a disc table on which the optical disc 2 is loaded. The spindle motor 32 rotates/drives a drive axis in, for example, a CLV (Constant Linear Velocity) mode or a CAV (Constant Angular Velocity) mode based on a spindle drive signal supplied from the spindle motor driver 38 to rotate the optical disc 2 loaded on the disc table.

The sled motor 33 moves the optical pick-up 31 in the radial direction of the optical disc 2 based on a sled drive signal supplied from the drive IC 36.

The skew motor 52 rotates a base 31E on which the optical pick-up 31 is disposed with a supporting point O as the axis based on a skew motor drive signal supplied from the skew motor driver 53 to control relative tilt between the optical disc 2 and optical pick-up 31, i.e., to perform skew control.

In the disc drive 3 having the above configuration, a laser beam from the optical pick-up 31 is radiated onto a recording surface of the optical disc 2 with a rotational velocity of the optical disc 2, a position of the optical pick-up 31 or the like being adjusted by the spindle motor 32 and sled motor 33, thereby locally producing an increase in temperature of the recording surface of the optical disc 2 to record desired data on the optical disc 2.

The RF amplifier 34 comprises a current-voltage conversion circuit, an amplifier circuit, a matrix computation circuit and the like, and generates a playback RF signal, a tracking error signal (hereinafter referred to as TE signal), a focus error signal hereinafter referred to as FE signal) and the like based on the detection output obtained in a detector of the optical pick-up 31. The RF amplifier 34 outputs the generated playback RF signal, TE signal, and FE signal as well as management information transmitted from the optical pick-up 31 to the DSP 35.

Further, the RF amplifier 34 outputs a laser intensity control signal for controlling intensity of the laser beam radiated from the optical pick-up 31 onto the optical disc 2. The RF amplifier 34 maintains constant intensity of the laser beam radiated from the optical pick-up 31 onto the optical disc 2 during playback time, and changes a level of the laser intensity control signal according to the video data from the DSP 35 during recording time.

The DSP 35 corresponds to the drive chip set 20 and is configured to: digitize an input playback RF signal and transmit the digitized signal to the system controller 15 or codec processing unit 16 under the control of the microcomputer 39 which corresponds to the drive control unit 19; transmit the TE signal and FE signal generated by the RF amplifier 34 to the drive IC 36; generate a recording pulse at recording time based on the video data transmitted from the codec processing unit 16 and output it to the optical pick-up 31; temporarily store management information of the data to be recorded on the optical disc 2 in, for example, the flash memory 40; and control each unit to perform various playback methods such as a random playback or shuffle playback while referring to the management information stored in the flash memory 40, after receiving an instruction from the system controller 15.

The drive IC 36 generates a focus drive signal and tracking start signal based on the TE signal or FE signal input from the DSP 35, and supplies it to the optical pick-up 31. Further, the drive IC 36 generates a sled drive signal for moving the optical pick-up 31 to a target track position and supplies it to the sled motor 33 under the control of the microcomputer 39.

The spindle motor driver 38 generates a spindle drive signal for rotating/driving the spindle motor 32 at a predetermined velocity and supplies it to the spindle motor 32 under the control of the microcomputer 39.

The storage unit 37 is constituted by, for example, a RAM (Random Access Memory) and the like and temporarily stores the playback RF signal transmitted from the DSP 35. The playback RF signal stored in the storage unit 37 is read out at a predetermined timing under the control of the microcomputer 39.

The microcomputer 39 corresponds to the drive control unit 19, and controls recoding/readout of video data on/from the optical disc 2, as well as spindle drive of the optical disc 2, and focus drive, tracking drive, sled drive, skew drive or the like of the optical pick-up 31.

The skew motor driver 53 generates a skew motor drive signal and supplies it to the skew motor 52 under the control of the microcomputer 39.

In the disc drive 3, the focus drive signal to be supplied from the drive IC 36 to the optical pick-up 31 is also supplied to the microcomputer 39 via a low-pass filter 50.

The low-pass filter 50 extracts only a DC component of the focus drive signal (focus drive voltage) and supplies it to the microcomputer 39.

A principle of the skew control performed in the disc drive 3 will be described below.

Figure 3A:
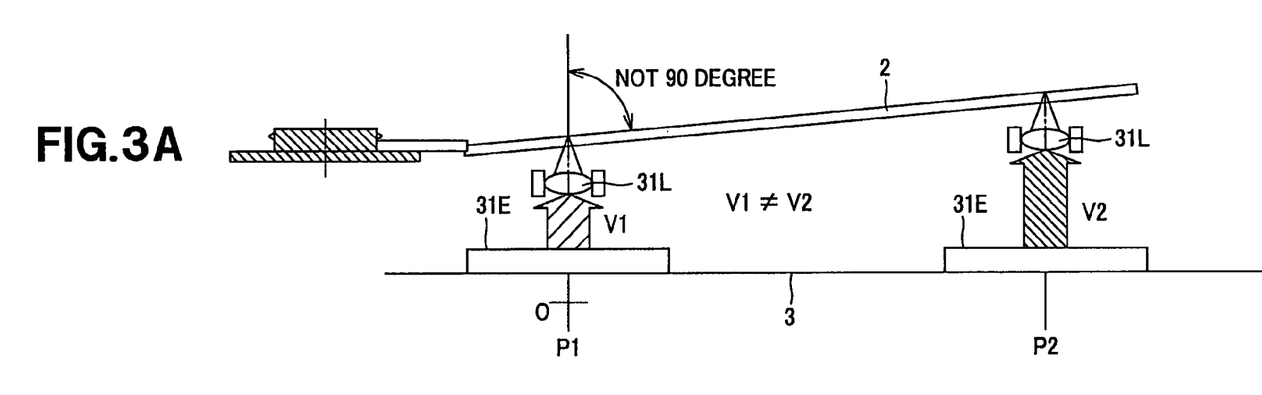
FIGS. 3A and 3B are schematic views showing a principle of skew control performed in the disc drive.
Figure 3B:
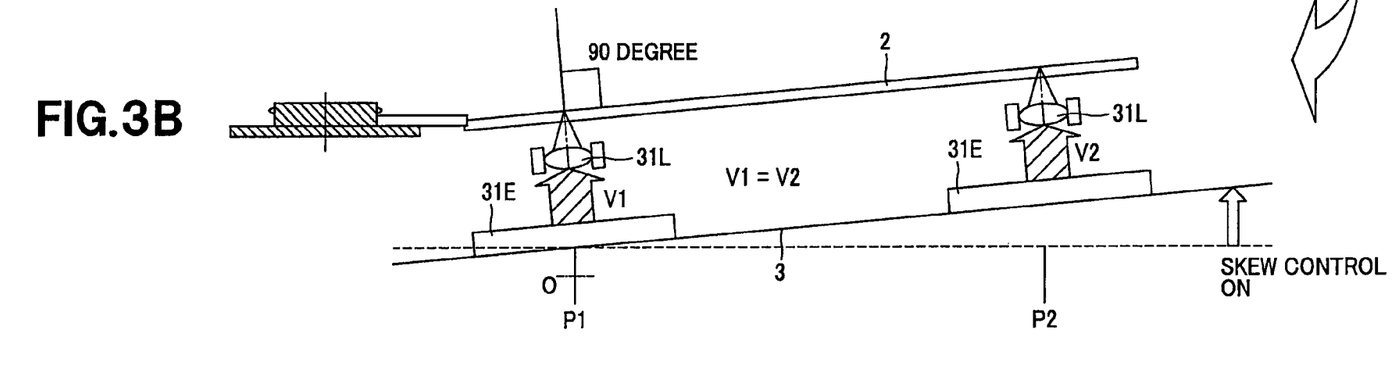
Figure 4:
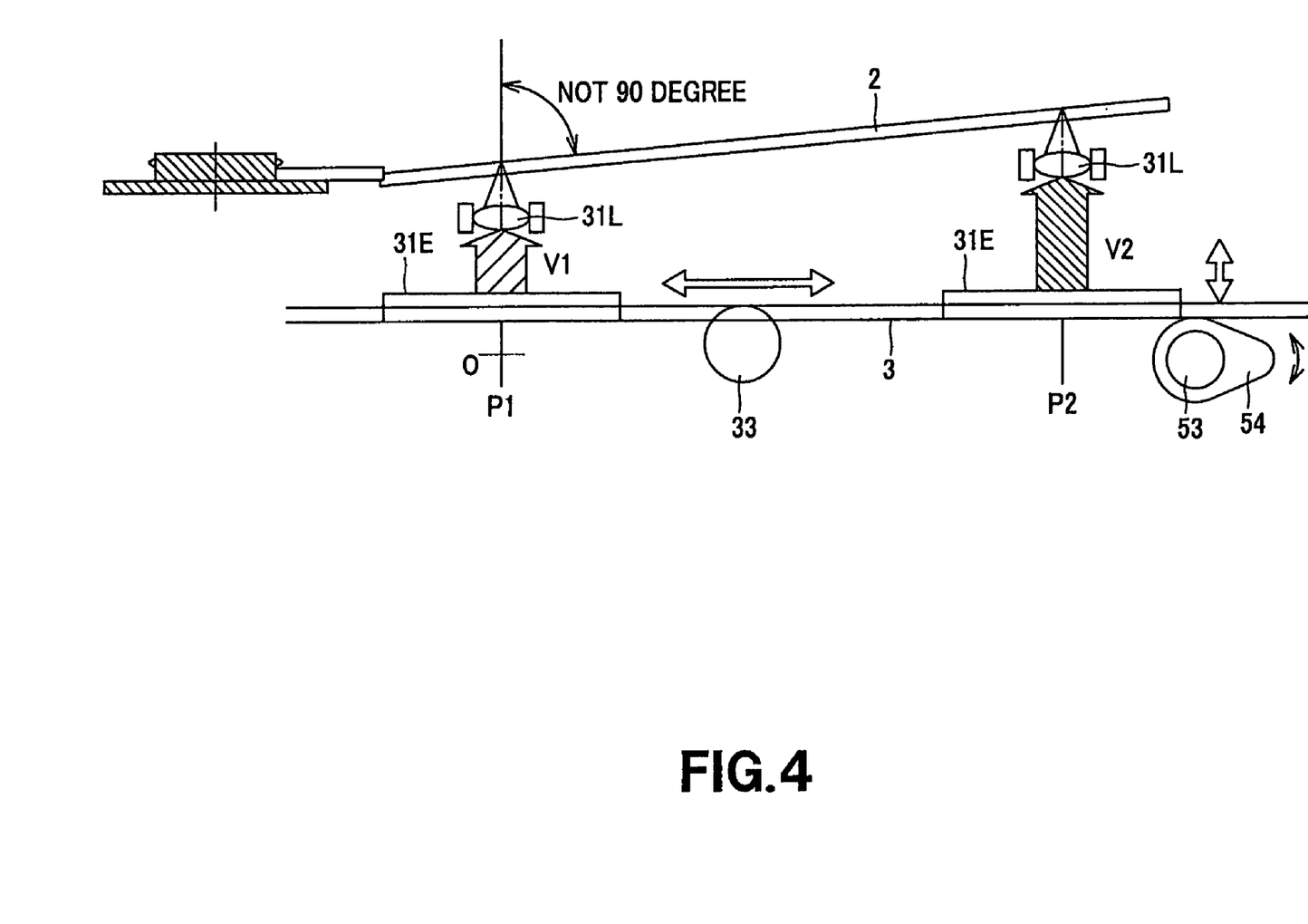
FIG. 4 is a schematic view showing a skew control mechanism in the disc drive.

As shown in FIG. 3A, in a state where a skew is present in the optical disc 2 and thereby the optical axis of the optical pick-up 31 is not perpendicular to the optical disc 2, there arises a difference in the distance from the base 31E of the optical pick-up 31 to the optical disc 2 depending on the position of the optical pick-up 3 in some cases. Since the focus servo serves to keep the distance between the objective lens 31L of the optical pick-up 31 and the optical disc 2 constant, in the case where a skew is present, there arises a difference between a focus drive voltage when the optical pick-up 31 is located on the inner peripheral side of the optical disc 2 and one when the optical pick-up 31 is located on the outer peripheral side of the optical disc 2. To eliminate the difference in the focus drive voltage, the skew motor 52 rotates a skew cam gear 54, as shown in FIG. 4, so as to change a vertical position of the optical pick-up 31. As a result, tilt between the optical disc 2 and optical pick-up 31 can be eliminated to allow the optical axis of the objective lens 31L of the optical pick-up 31 to strike the optical disc 2 at right angles, as shown in FIG. 3B.

In the disc drive 3, skew angle is controlled such that focus drive voltages V1 and V2, which are respectively obtained, in a state where a focus servo of the optical pick-up 31 is ON, at points P1 and P2 set by moving the optical pick-up 31 in the radial direction of the optical disc 2 are made equal to each other.

The microcomputer 39 of the disc drive 3 has an A/D conversion circuit, and performs skew control based on the DC component of the focus drive signal (focus drive voltage) supplied from the drive IC 36 via the low-pass filter 50.

Figure 5:
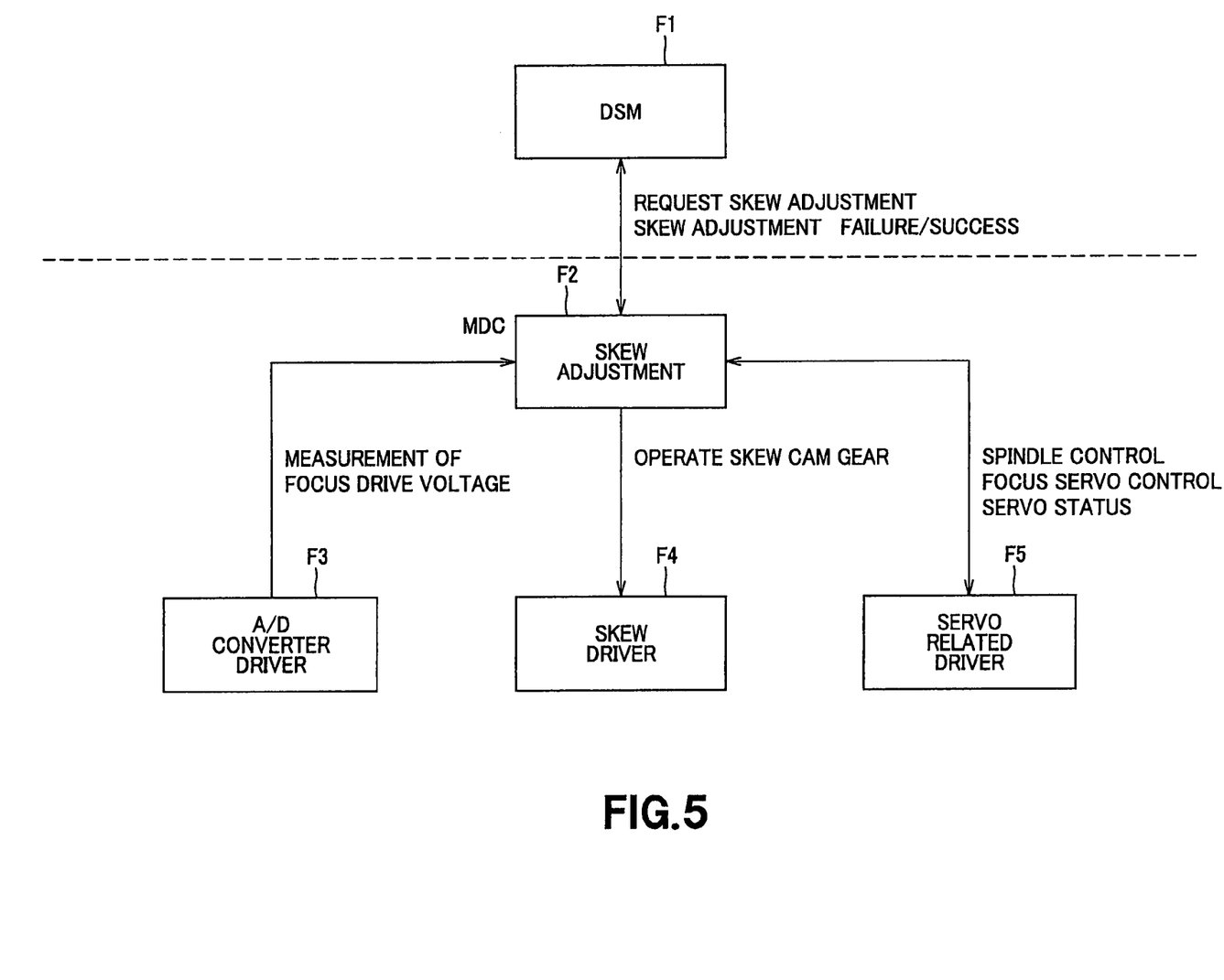
FIG. 5 is a block diagram showing a configuration of skew control functions implemented by software under the control of a microcomputer in the disc drive.

As shown in FIG. 5, this microcomputer 39 has a skew control function implemented by software, in which a skew adjustment F2 in an MDC (Mechanical Drive Control) task is invoked from a DSM (Disc Status Manager) task F1, and the skew adjustment F2 invokes a driver F3 of the A/D converter, a skew motor driver F4, and a servo-related driver F5 to perform skew control.

Figure 6:
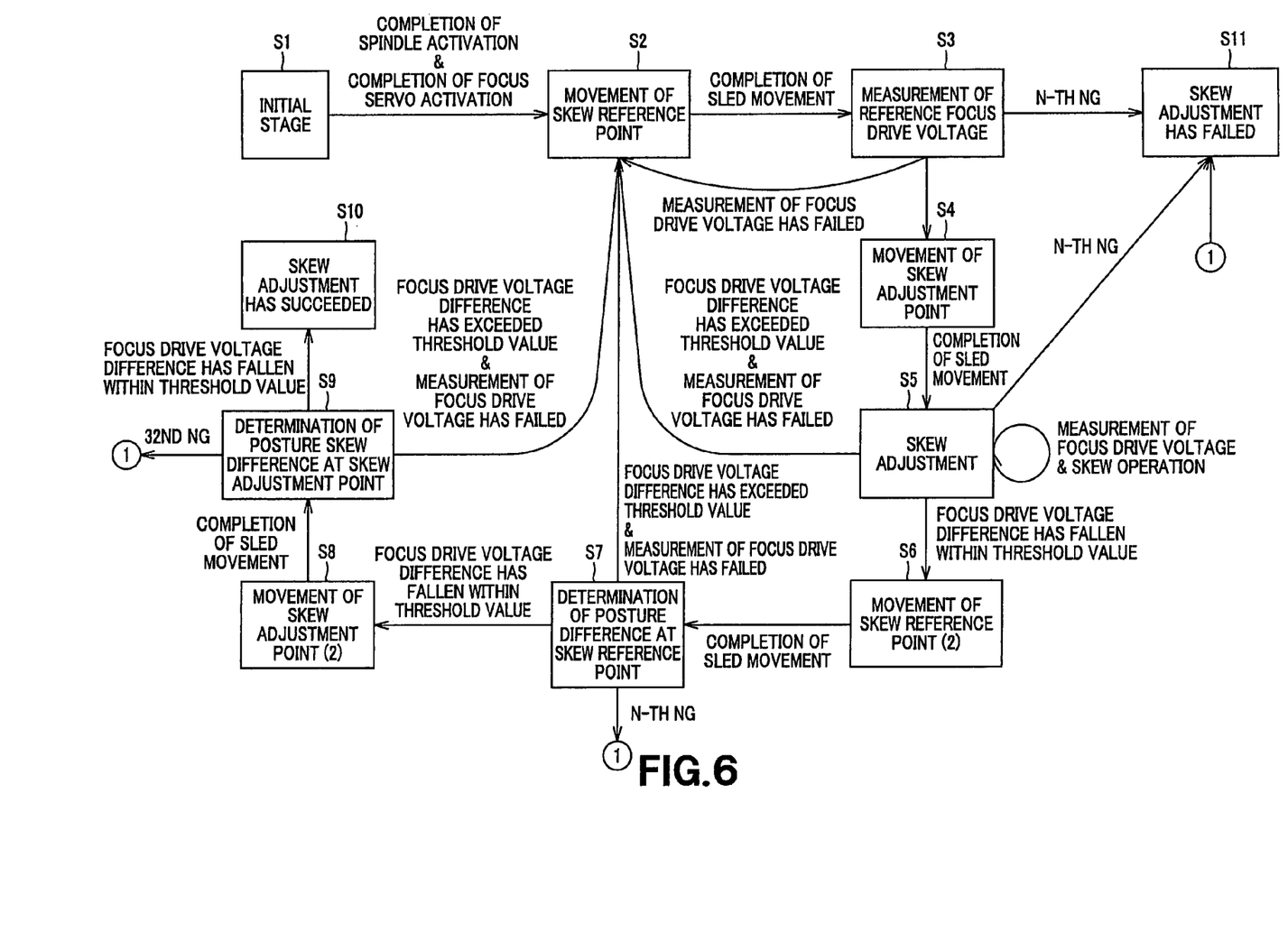
FIG. 6 is a state transition diagram of skew control performed by the microcomputer.

FIG. 6 is a state transition diagram of skew control performed by the microcomputer 39.

When the spindle servo and focus servo have been started in initial state S1 before moving into skew adjustment, the microcomputer 39 in the disc drive 3 shifts to a skew reference point movement state S2.

The skew reference point movement state S2 is a state where a sled is moved to a reference point position P1. In the skew reference point movement state S2, the microcomputer 39 controls the sled motor 33 to move the optical pick-up 31 to a position where the focus drive signal does not change or changes a little even in the case of effecting a skew, e.g., to a position of the supporting point O. After completion of the movement of the sled, the microcomputer 39 shifts to a skew reference point measurement state S3.

The skew reference point measurement state S3 is a state where the focus drive voltage that acts as a reference for performing skew adjustment is measured. The focus drive voltage when a focus servo is ON is obtained through the low-pass filter as a DC voltage, which is then A/D converted, and the voltage value V1 at that time is stored. After the measurement of the focus drive voltage at the reference point position P1 has been completed, the microcomputer 39 shifts to a skew adjustment point movement state S4. If the measurement operation has failed in the skew reference point measurement state S3, the microcomputer 39 shifts back to the skew reference point movement state S2. Note that if the measurement of the focus drive voltage at the reference point position P1 has failed, and the skew reference point movement state S2 and skew reference point measurement state S3 are repeated by N times, the microcomputer 39 shifts to a skew adjustment failure state S11.

The skew adjustment point movement state S4 is a state where the sled is moved to an adjustment point position P2. In the skew adjustment point movement state S4, the microcomputer 39 controls the sled motor 33 to move the optical pick-up 31 to the position P2 apart from the reference point position P1 (position of the supporting point O) by a given distance L. When the movement of the sled has been completed, the microcomputer 39 shifts to a skew adjustment state S5.

The skew adjustment state S5 is a state where a skew between the optical pick-up 31 and optical disc 2 is adjusted by rotating the skew cam gear. In the skew adjustment state S5, the microcomputer 39 measures a focus drive voltage V2 at the adjustment point position P2 when a focus servo is ON, and compares the focus drive voltage V2 at the adjustment point position P2 with the focus drive voltage V1 at the reference point position P1. When the angular difference between V1 and V2 falls in a predetermined range (for example, the case corresponds to V2−V1=0.05°), the microcomputer 39 determines that there is no need to perform skew control. On the other hand, when the angular difference between V1 and V2 exceeds a predetermined range, the microcomputer 39 controls rotation of the skew motor 52 in a direction to allow the V1 and V2 to correspond to each other. The skew motor 52 is constituted by, for example, a stepping motor, with which it is previously known that what level of a skew change is generated, that is, how many angle changes are made, by one step feed. Therefore, it is possible to control the number of steps to be fed and feeding direction based on the known value. When one rotation control of the skew motor 52 has been completed, the focus drive voltage is measured again at the adjustment point position P2, followed by the same control operations as above. When the angular difference between V1 and V2 falls in the target range for the last time, skew control at the adjustment point position P2 ends and the microcomputer 39 shifts to a skew reference point movement state S6.

Note that in the case where the above angular difference does not fall in a range of the target skew difference even when the skew adjustment operation at the adjustment point position P2 is repeated by a predetermined times, or in the case where the measurement of the focus drive voltage at the adjustment point position P2 has failed, the microcomputer 39 shifts to the skew reference point movement state S2.

Figure 7:
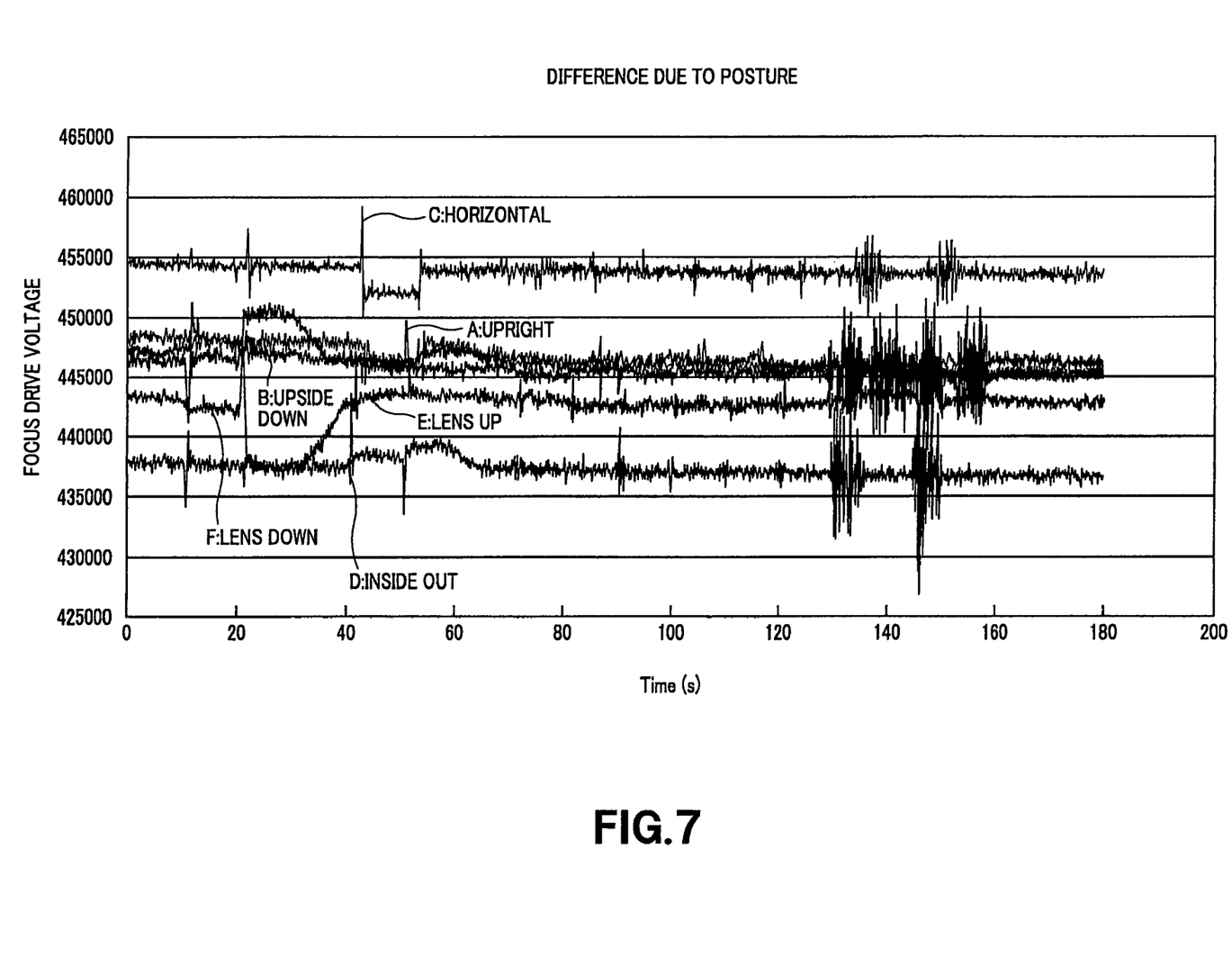
FIG. 7 is a graph showing an example of a change in a focus drive voltage due to difference in posture.

The skew control in the disc drive 3 is properly performed as long as there occurs no change in the posture of the entire apparatus or as long as the entire apparatus is in a stationary condition in which there is no disturbance, from the time when the focus drive voltage at the reference point position P1 is measured to the time when skew control at the adjustment point position P2 has been completed. This is because the focus drive voltage is accurately measured and thereby a skew error is correctly detected since there is no posture difference or disturbance that influences the focus drive voltage. However, when the entire apparatus is slanted by 90-degree, or turned upside down from the time after the measurement of the focus drive voltage V1 at the reference point position P1 has completed to the time before the focus drive voltage V2 at the adjustment point position P2 is started to be measured, the focus drive voltage is shifted as shown in FIG. 7. As a result, a voltage change corresponding to, for example, 1-degree in terms of skew angle is generated. When the skew correction is performed based on the shifted voltage, a skew position may be adjusted to an unforeseen abnormal position.

Figure 8:
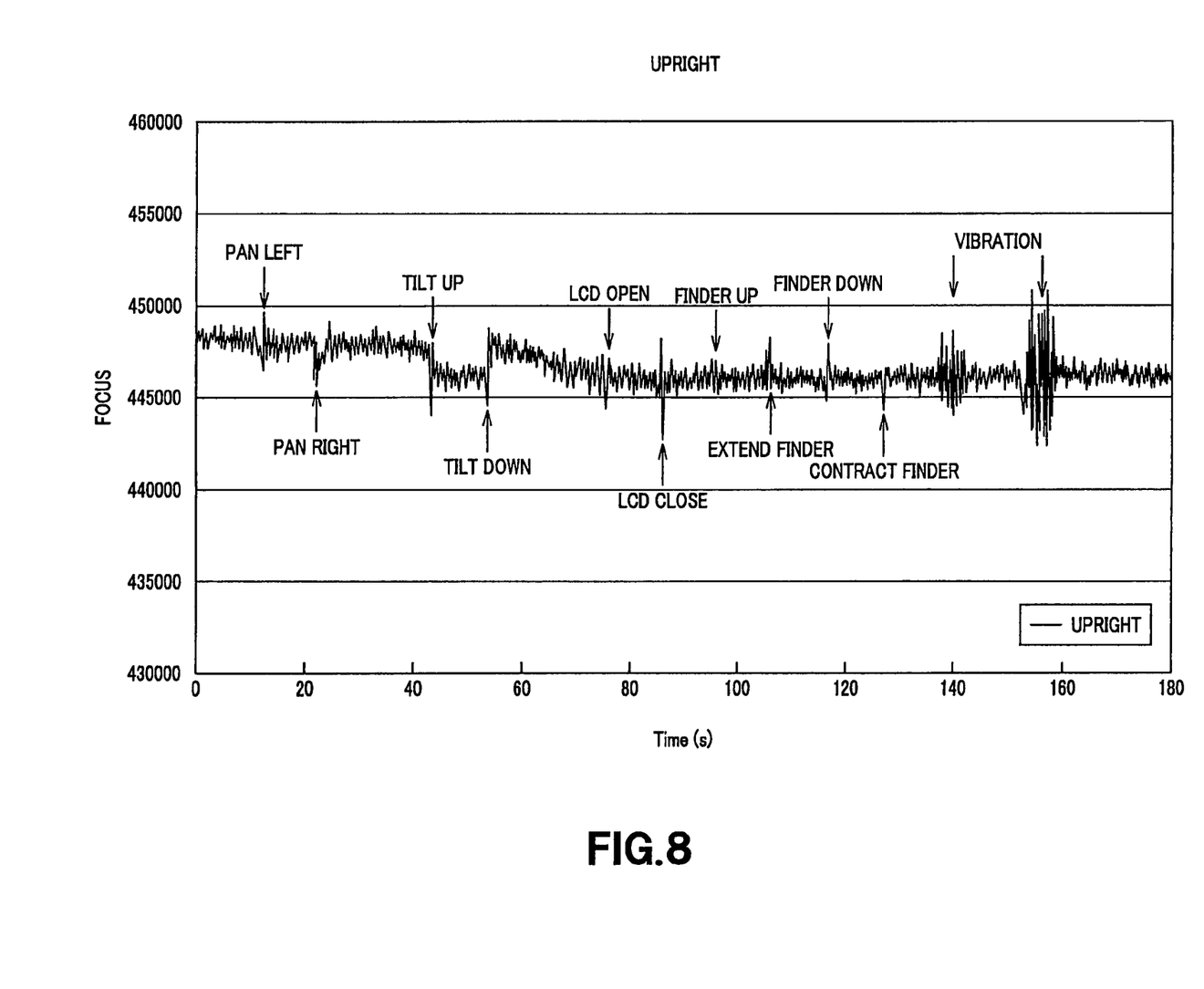
FIG. 8 is a graph showing an example of a change in a focus drive voltage due to influence of disturbance.

The focus drive voltage changes depending on posture difference. That is, when its own weight of the objective lens or biaxial device is added or subtracted, a significant difference occurs in the drive voltage. Further, the focus drive voltage changes due to influence of disturbance, shock, or the like. That is, as is often the case with the camcorder, when, after inserting a disc, a user shifts the camcorder from one arm to the other, performs shooting with pan/tilt operation or performs shooting while moving during skew control based on the focus voltage, the focus drive voltage changes due to influence of disturbance, shock or the like as shown in FIG. 8 even if the camcorder is in an upright state. The difference in the focus drive voltage caused by the change is determined as a skew, and skew control based on the skew value can lead to an erroneous result.

After completion of skew control at adjustment point position P2, the microcomputer 39 of the disc drive 3 shifts to the skew reference point movement state S6 and again controls the sled motor 33 to move the optical pick-up 31 to the reference point position P1. When the movement of the sled has been completed, the microcomputer 39 shifts to a skew reference point posture difference check state S7.

The skew reference point posture difference check state S7 is a state where posture difference is checked. In the skew reference point posture difference check state S7, the microcomputer 39 measures a focus drive voltage V3 at the reference point position P1 and compares the obtained focus drive voltage V3 with the focus drive voltage V1 measured in the skew reference point measurement state S3. When the difference between V1 and V3 falls within a threshold vale, the microcomputer 39 determines that a change in the posture has not occurred during skew adjustment, and shifts to a skew adjustment point movement state S8. When the difference between V1 and V3 exceeds a threshold value, the microcomputer determines that there has occurred a change in the posture during skew adjustment and shifts to the skew reference point movement state S2, followed by the same control operations as above. Further, in the skew reference point posture difference check state S7, when the measurement of the focus drive voltage has failed, the microcomputer 39 shifts to the skew reference point movement state S2.

As described above, adverse effect caused by the posture difference can be prevented by confirming the focus drive voltages V1 and V3 at the reference point position P1. However, the above procedure is probabilistically not complete in view of the case where there exists posture difference only during the measurement of V2.

When there has occurred no posture change at the reference point position P1 in the skew reference point posture difference check state S7, the microcomputer 39 shifts to the skew adjustment point movement state S8 and controls the sled motor 33 to move the optical pick-up 31 to the adjustment point position P2. When the movement of the sled has been completed, the microcomputer 39 shifts to a skew adjustment point posture difference check state S9.

The skew adjustment point posture difference check state S9 is a state where posture difference at the adjustment point position P2 is checked. In the skew adjustment point posture difference check state S9, the microcomputer 39 again measures a focus drive voltage V4 at the adjustment point position P2 and compares the obtained focus drive voltage V4 with the focus drive voltage V2 that has been most recently measured in the skew adjustment state S5. When the values of V2 and V4 considerably differ from each other, it is possible to determine that there has occurred posture difference. When the difference between V2 and V4 falls within a threshold value, the microcomputer 39 determines that there has occurred no posture change during skew adjustment and shifts to a skew adjustment success state S10. When the difference between V2 and V4 exceeds a threshold value, the microcomputer 39 determines that there has occurred a change in the posture during skew adjustment and shifts to the skew reference point movement state S2, followed by the same control operations as above. Further, in the skew reference point posture difference check state S7, when the measurement of the focus drive voltage has failed, the microcomputer 39 shifts to the skew reference point movement state S2.

By confirming presence/absence of posture difference more than once in this manner, adverse effect of posture difference can be more definitely eliminated.

As shown in FIG. 8, the focus drive voltage fluctuates or shifts in a state where disturbance is applied. When skew control is performed based on the measurement value obtained in the above state, a desired result cannot be obtained. In order to cope with this problem, confirming, during each measurement, whether a result obtained by the each measurement falls in a predetermined range is effective. It is assumed that after multiple measurements are performed with 40 ms taken for each measurement, an average value is calculated from the measurements. It is further assumed, in the circumstance, four measurements are performed, for example. When all of the four measurement values fall into a predetermined range (for example, 0.05° in terms of skew angle), it is determined that the relevant measurement is effective. Then, a definitive measurement value is calculated by averaging the four measurement values. Alternatively, the medium value or the most recently measured value may be adopted as the definitive measurement value. As a result, it is possible to prevent a selection of the measurement value obtained at the time where the disturbance is applied, even if a user roughly handles the apparatus while skew control is performed.

Further, for the measurement of the focus drive voltage, a method in which after multiple measurements are performed in order to increase measurement accuracy and to accurately measure an average drive voltage even for a disc with surface runout, an average value is calculated from the measurements is effective. In this case, the multiple measurements should be performed with measurement points disposed at regular intervals, and the total-number of the measurements should be an integral multiple of a rotation period.

An object of skew control is that an optical axis of the laser beam radiated by the optical pick-up 31 strikes the disc at right angles (or, to prevent coma aberration from occurring). A skew is present in the optical pick-up 31 itself in general, and therefore, it is not necessarily the case that a radiated laser beam is straightforward. In view of the above, a skew of the optical pick-up 31 must be corrected. Otherwise, a coma aberration occurs due to the presence of a skew in some optical pick-ups, with the result that it is impossible to read out data from optical disc 2 in a good condition.

A skew of the optical pick-up 31 can be corrected by using the following methods A and B after previous measurement of a skew of the optical pick-up 31.

Method A: controlling a rotation of the skew motor 52 so that the voltage difference between V1 and V2 corresponds to the value obtained by converting the skew value to a corresponding focus drive voltage.

Method B: converting the previously measured skew value to a corresponding focus drive voltage, which is then added to V1 to obtain a reference value, and performing control so that the reference value and V2 are equal to each other.

When a skew of the optical pick-up 31 is given as data, the method A is effective. Otherwise, the following method is effective; controlling a skew using a glass disc or the like to adjust a skew so that a state in which the best signal quality can be achieved, measuring focus drive voltages at the reference point position P1 and adjustment point position P2, and storing the difference between the focus drive voltages at the P1 and P2, which corresponds to a skew of the optical pick-up 31, in a flash memory or the like of a microcomputer as an adjustment value.

In the present embodiment, the reference point position P1 is located on the relative inside of the optical disc 2. Therefore, when the adjustment point position P2 is located on the position near the relative outer circumference of the optical disc 2, the focus drive voltage due to a change in skew can be detected with relatively high sensitivity. Further, selecting a position in which the focus drive voltage does not change even in the case of effecting a skew as the reference point position P1 eliminates the need for back-and-forth traveling many times between the reference point position P1 and adjustment point position P2 for repeating a measurement. This leads to easy control and is very advantageous to a reduction in the number of measurements and a reduction in adjustment time.

Figure 9A:
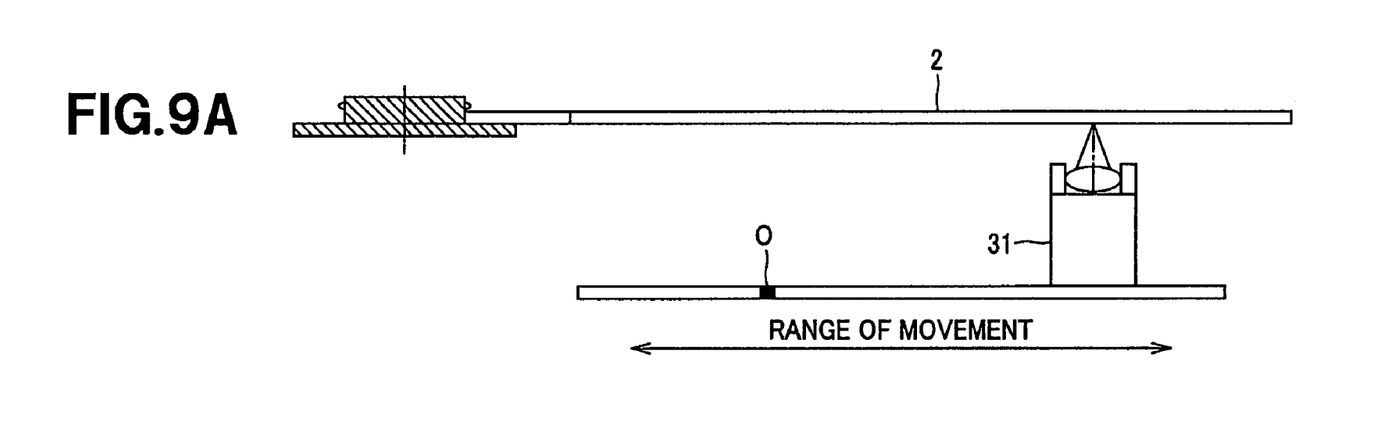
FIGS. 9A and 9B are schematic views for explaining positioning of a supporting point of a skew control mechanism in the disc drive.
Figure 9B:
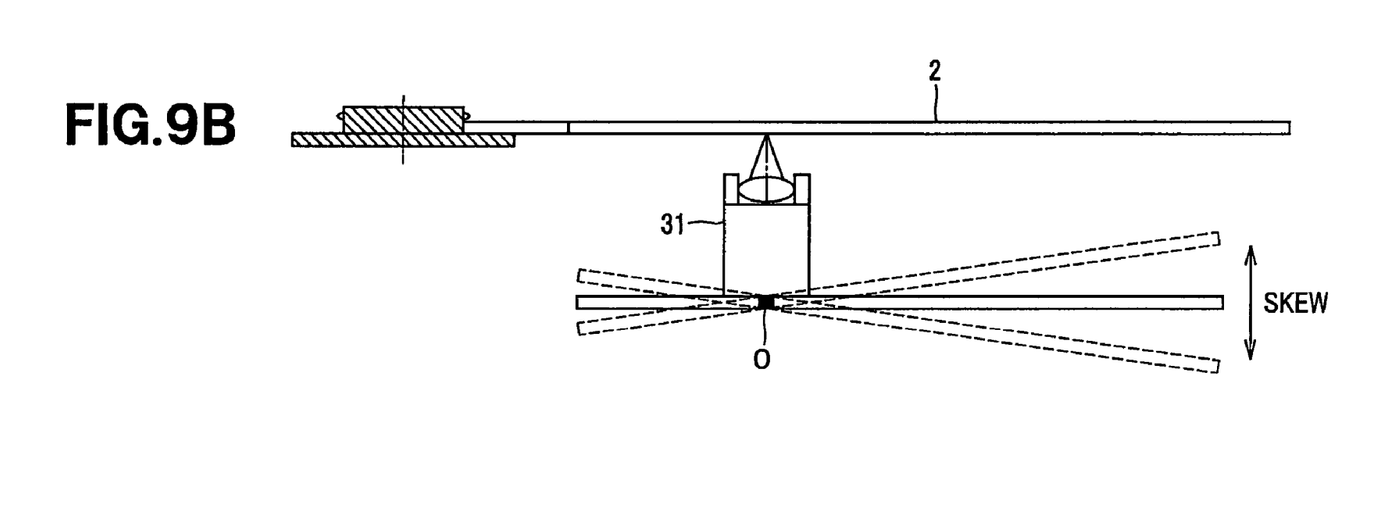

In order to mechanically activate a skew, various configurations are available. For example, as shown in FIG. 9A, a supporting point O of a skew rotation is disposed within the radial direction movement range of the optical pick-up 31. In the circumstance, even when a skew is changed, the distance between the optical pick-up 31 and the optical disc 2 does not change, as shown in FIG. 9B. That is, by disposing a mechanical supporting point O of a skew change such that a point in which the distance between the optical pick-up 31 and the optical disc 2 does not change even when a skew is changed exists, and measuring the focus drive voltage at two points with the aforementioned point, in which the distance between the optical pick-up 31 and the optical disc 2 does not change even when a skew is changed, set as one measuring point of the two, it is possible to correctly perform skew control even with posture difference or disturbance.

What is claimed is:

1. A skew control method for an optical disc drive apparatus having a radial skew control mechanism, comprising the steps of:
    selecting as a measurement point, out of a plurality of measurement points of a focus drive signal amplitude, a point at which the focus drive signal amplitude does not change even when skew angle is changed;
    measuring a focus drive signal amplitude at the plurality of measurement points set by moving an optical pick-up in a radial direction of an optical disc in a state where a focus servo of the optical pick-up is ON; and
    controlling skew angle so that a voltage value at said selected measurement point and a voltage value at another of said plurality of measurement points are equal.

2. The skew control method according to claim 1, further comprising the steps of:
    disposing a mechanical supporting point of a skew change such that a point at which the distance between the optical pick-up and the optical disc does not change even when a skew is changed exists;
    measuring the focus drive signal amplitude at two points; and
    selecting one point from the two, in which the focus drive signal amplitude does not change even when a skew angle is changed.

3. The skew control method according to claim 1, further comprising the steps of:
    confirming, after the completion of the controlling step, whether the focus drive signal amplitude at each measurement point falls in a predetermined expected range; and performing said controlling step again when the focus drive signal amplitude at each measurement point is out of the predetermined range.

4. The skew control method according to claim 1, further comprising the step of:
performing a correction operation by adding the focus drive signal amplitude corresponding to a skew included in the optical pick-up to the measured focus drive signal amplitude.

5. The skew control method according to claim 1, further comprising the steps of:
measuring the focus drive signal amplitude more than once;
confirming whether a variation in the voltage values measured in the measuring step falls in a predetermined range; and
waiting, if a variation in the voltage values is out of the predetermined range, until the variation falls in the predetermined range.

6. The skew control method according to claim 1, further comprising the steps of:
measuring the focus drive signal amplitude at a plurality of measurement points set in correspondence with disc rotation, wherein
the measurement points are disposed at regular intervals, and start to end of the measurement points is an integral multiple of a disc rotation circle.

7. A skew control unit included in an optical disc drive apparatus having a radial skew control mechanism, comprising:
a skew control mechanism configured to measure a focus drive signal amplitude at a plurality of points set by moving an optical pick-up in a radial direction of an optical disc in a state where a focus servo of the optical pick-up is ON and controlling skew angle so that voltage values at the points are equal among them,
the skew control mechanism being configured to select, as a measurement point of the focus drive signal amplitude, one point at which the focus drive signal amplitude does not change even when skew angle is changed to control skew angle.

8. The skew control unit according to claim 7, further comprising:
a mechanical supporting point of a skew change disposed such that a point at which the distance between an optical pick-up and optical disc does not change even when a skew is changed exists, and
the skew control mechanism is configured to measure the focus drive signal amplitude at two points and select, as one measuring point, the point at which the focus drive signal amplitude does not change even when skew angle is changed so as to control skew angle.

9. The skew control unit according to claim 7, wherein the skew control mechanism is configured to confirm, after the completion of skew control, whether the focus drive signal amplitude at each measurement point falls in a predetermined expected range and performs skew control again when the focus drive signal amplitude at each measurement point is out of the predetermined range.

10. The skew control unit according to claim 7, wherein the skew control mechanism is configured to perform a correction operation by adding the focus drive signal amplitude corresponding to a skew included in the optical pick-up to the measured focus drive signal amplitude.

11. The skew control unit according to claim 7, wherein the skew control mechanism is configured to measure a focus drive signal amplitude more than once, confirm whether a variation in the measured voltage values falls in a predetermined range, and wait, if the variation in the measured voltage values is out of the predetermined range, until the variation falls in the predetermined range.

12. The skew control unit according to claim 7, wherein
the skew control mechanism is configured to measure a focus drive signal amplitude at a plurality of points set in correspondence with disc rotation,
the measurement points being disposed at regular intervals, and start to end of the measurement points being an integral multiple of a disc rotation circle.

13. A skew control unit included in an optical disc drive apparatus having a radial skew control mechanism, comprising:
a measurement mechanism configured to measure a focus drive signal amplitude at a plurality of points set by moving an optical pick-up in a radial direction of an optical disc in a state where a focus servo of the optical pick-up is ON, and
a controller configured to control skew angle so that voltage values at the points are equal among them, the skew control mechanism is configured to select, as a measurement point of the focus drive signal amplitude, one point at which the focus drive signal amplitude does not change even when skew angle is changed to control skew angle.

* * * * *